United States Patent [19]

Lewis

[11] Patent Number: 4,903,008
[45] Date of Patent: Feb. 20, 1990

[54] INTERNATIONAL HAND SIGN STOP SIGNAL

[76] Inventor: Bill Lewis, 4146 Martin Luther King, Jr. Way, Oakland, Calif. 94609-2320

[21] Appl. No.: 214,005

[22] Filed: Jun. 30, 1988

Related U.S. Application Data

[63] Continuation-in-part of Ser. No. 34,029, Apr. 2, 1987, abandoned.

[51] Int. Cl.⁴ .............................................. B60Q 1/44
[52] U.S. Cl. .................................. 340/479; 340/458; 362/80.1
[58] Field of Search ....................... 340/71, 87, 97, 79, 340/80, 103, 107, 110, 111, 112, 119, 479, 458, 468; 40/564, 591, 593; 362/61, 80, 359, 80.1

[56] References Cited

U.S. PATENT DOCUMENTS

| | | | |
|---|---|---|---|
| 1,479,879 | 1/1924 | Steinhilper | 362/359 |
| 1,629,425 | 5/1927 | Wardhaugh | 340/79 |
| 1,866,185 | 7/1932 | Yarnell | 340/111 |
| 2,119,549 | 6/1938 | Lochmann | 340/79 |
| 4,575,782 | 3/1986 | Levine et al. | 340/87 X |
| 4,703,398 | 10/1987 | Huth et al. | 340/97 X |

FOREIGN PATENT DOCUMENTS

| | | | |
|---|---|---|---|
| 16959 | 6/1927 | Australia | 340/111 |
| 348502 | 5/1931 | United Kingdom | 340/111 |

Primary Examiner—Joseph A. Orsino
Assistant Examiner—Brian R. Tumm
Attorney, Agent, or Firm—Bielen, Peterson & Lampe

[57] ABSTRACT

A brake signal for a vehicle utilizing a housing having a chamber and a base portion. The chamber includes a first opening leading to the inside from the exterior of the housing. A source of light, activated by the vehicle brake, is mounted within the chamber at a certain level above the base of the housing. A translucent pattern panel is mounted in the first opening. A second opening is also included in the chamber at a level above the source of light. The light source is positioned between the first and second openings to the chamber to permit the driver of the vehicle to ascertain the proper operation of the signal.

3 Claims, 1 Drawing Sheet

INTERNATIONAL HAND SIGN STOP SIGNAL

CROSS REFERENCES TO RELATED APPLICATIONS

The present application is a continuation-in-part of my prior filed application, Ser. No. 034,029, filed Apr. 2, 1987, now abandoned.

BACKGROUND OF THE INVENTION

The present invention relates to a novel and useful brake signal for a vehicle.

Recently, governmental authorities have required the use of a third brake signal in addition to the two brake signals normally found on a vehicle. This third brake signal is usually mounted in the rear window at the central portion of the vehicle. Since many of the third brake lights are retrofitted onto vehicles, they are normally mounted inside the vehicle, on the rear shelf, adjacent the rear window. Although the third brake signal has gained favorable attention in reducing accidents, this signal is often inoperable without the vehicle operator's knowledge. Although newer vehicles include brake light "out" warning lights, the third brake light is often not connected to such a telemetering system. Also, as the novelty of a third light lessens, it is often necessary to alert drivers behind a vehicle that the brakes are being applied to the vehicle in front by means in addition to a third brake light.

A brake signal which achieves these objectives would be a great advance in the automotive field.

SUMMARY OF THE INVENTION

In accordance with the present invention, a novel and useful brake signal for a vehicle is provided. The brake signal of the present invention utilizes a housing having a chamber and a base. The base may be fixed to the rear shelf of an automobile or a similar structure for other vehicles. A chamber includes a first opening, which is of a rather large size, and a second opening which is relatively small in size, compared to the first opening. Within the housing is mounted a source of light activated by application of the vehicle brake. Such light source would be mounted a certain level above the base of the housing within the chamber of the housing.

The brake signal of the present invention also includes a translucent, patterned panel and means for mounting the same in the first relatively large opening to the chamber of the housing. The translucent patterned panel may include an international symbol for the command "Stop". In addition, the translucent patterned panel may be formed with other symbols or words indicating "Stop". The panel is removably fixed to the first opening of the chamber to provide interchangability. Such means for mounting the panel in the first opening to the chamber of the housing may include a clip, extending along the bottom or base of the housing, and a hood which may be fixed to the housing. The hood may also include a shoulder portion for holding the panel against the opening to the chamber of the housing.

A second relatively small opening to the housing chamber is also defined in the present invention. The second opening would be at a level in the housing above the source of light. Thus, the source of light would lie below the second chamber opening and between the first and second openings to the chamber. The operator of the vehicle would then be able to peer through the relatively small second opening to ascertain the workability of the brake signal of the present invention without being exposed to the brightness of the light source. This is especially important at night. Also, where the translucent panel is tinted, e.g., red, only red light would pass through the second opening to the chamber, a feature which would tend to maintain the driver's night vision.

In this regard, the light source mounting means may include a bracket fixed in an upright position relative to the base of the housing. A socket would be fixed to the bracket at an oblique angle relative to the bracket, generally centering the light source at the translucent panel. Thus, the oblique angle of the socket would permit easy replacement of the light source bulb and minimize the length of the support bracket. This latter feature strengthens the bracket, especially where the bracket is exposed to vehicle vibration.

It may be apparent that a novel and useful brake signal for a vehicle has been described.

It is therefore an object of the present invention to provide a brake signal for a vehicle which includes a removable translucent panel which may be patterned for employment with symbols or words indicating the command "Stop".

It is another object of the present invention to provide a brake signal for a vehicle which includes a visual indicator of the workability of the signal without exposing the operator of the vehicle to the bright rays of the light source used in the signal.

A further object of the present invention is to provide a brake signal for a vehicle which is rugged and easily maintained.

A further object of the present invention is to provide a brake signal for a vehicle which is easily retrofitted in existing vehicles as a third brake light.

A further object of the present invention is to provide a brake signal for a vehicle which may be employed internationally.

The invention possesses other objects and advantages, especially as concerns particular characteristics and features thereof, which will become apparent as the specification continues.

For better understanding of the invention, reference is made to the following detailed description of the preferred embodiments thereof, which should be referenced to the hereinabove described drawings.

DESCRIPTION OF THE PREFERRED EMBODIMENTS

Various aspects of the present invention will evolve from the following detailed description of the preferred embodiments, which should be coordinated with the hereinabove described drawings.

Figure 2:
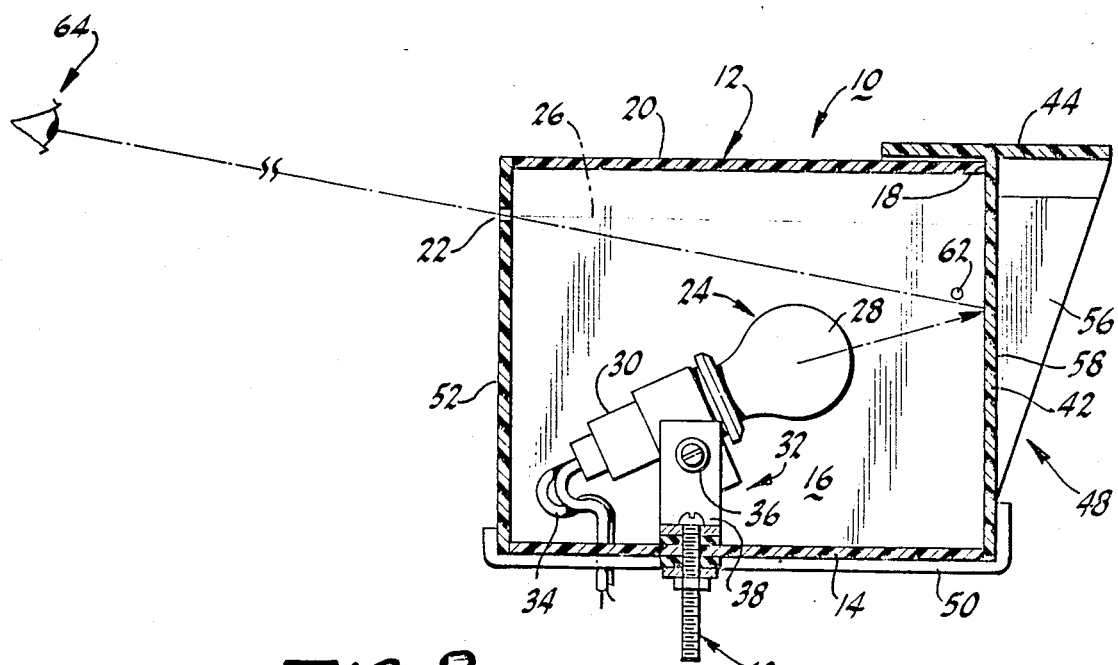
FIG. 2 is a sectional view, taken along line 2—2 of FIG. 1, with an additional ray line indicating the visual appearance of the signal to the vehicle operator.

The invention as a whole is depicted in the drawings by reference character 10. The brake signal 10 includes as one of its elements a housing 12 which is essentially rectangular in cross-sectional configuration. Housing 12 includes a bottom or base 14 and a chamber 16, FIG. 2.

Chamber 16 possesses a relatively large first opening 18 which extends from the base 14 to the top portion 20 of housing 12. Chamber 16 also has a relatively small opening 22, the function of which will be discussed hereinafter.

A source of light 24 is mounted within housing chamber 16 at a certain level above base 14, but below level line 26 representing the level of small opening 22. Source of light 24 includes a lamp 28, which fits into socket 30. Socket 30 is angled obliquely with respect to base 14 of housing 12 and is supported by bracket means 32, thereat. Electrical conductors 34 extend into chamber 16 and carry a signal from the activated brake of the vehicle (not shown) which illuminates a lamp 28. Bracket means 32 holds socket 30 by the use of setscrew 36. Upright portion 38 of bracket 32 is fixed to base 14 of housing 12 by the use of nut, bolt and washer assembly 40.

Figure 1:
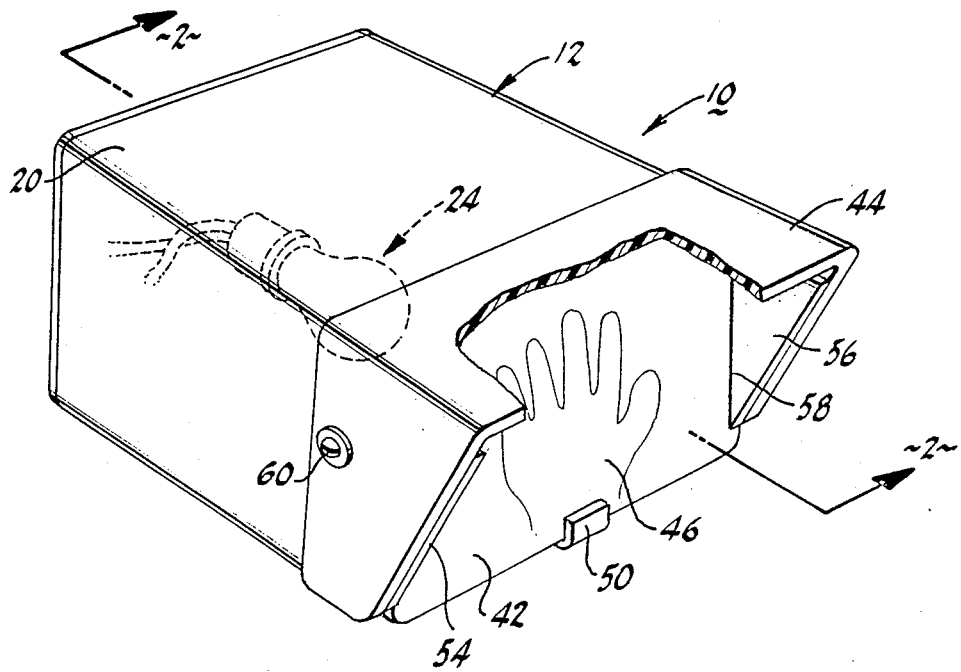
FIG. 1 is a top and perspective view, showing a portion of the light-protective hood cut away to reveal a translucent panel beneath.

A translucent patterned panel 42 is held at opening 18 by the use of a hood 44. As depicted in FIG. 1, panel 42 includes an international stop symbol 46 which is in the likeness of a human hand. It should be understood that other symbols or words may be used in conjunction with translucent panel 42. Panel 42 is interchangeably and removably held to opening 18 by hood 44. Such means 48 for removably mounting panel 42 to opening 18 includes a U-shaped clip 50 which extends under the rear portion 52 of housing 12 and around the bottom portion of panel 42, as shown in FIG. 1. Hood 44 includes a pair of shoulders 54 and 56, each of which includes a ledge 58 and another (not shown) which rests against panel 42. Setscrews 60 and 62 hold hood 44 to housing 12 to maintain the support of panel 42 by shoulders 54 and 56.

In operation, the brake signal device 10 bolts into the shelf of the back window of a vehicle (not shown) by the use of bolt, nut, and washer assembly 40. Conductors 34 then wire to the automobile or vehicle system which produces an electrical signal each time the brake is applied. The light emanating from lamp 48 passes through panel 42 and displays a pattern to the vehicle following the vehicle utilizing brake signal device 10. The panel 42 may be interchanged with other symbols or words which have meanings in different geographical locations. Lamp 28 may be painted with heat resistant paint or frosted by other means to produce a soft, luminous light. However, the observer 64, peering directly toward brake signal device 10 or indirectly through a rear view mirror would see only light reflected or diffused from panel 42 through small opening 22, since lamp 28 lies below level line 26, heretofore described. Thus, the brightness of lamp 28 does not reach the observer 64. If the panel 42 is tinted red, only red rays of light pass through opening 22 to observer 64 which preserves the observers night vision when driving in darkness.

While in the foregoing, embodiments of the present invention have been set forth in considerable detail for the purposes of making a complete disclosure of the invention, it may be apparent to those of skill in the art that numerous changes may be made in such details without departing from the spirit and principles of the invention.

What is claimed is:

1. A brake signal for a vehicle comprising:
   a. a housing; said housing including a chamber and a first opening to said chamber, said housing further including a base;
   b. a source of light, activated by the vehicle brake;
   c. a translucent patterned panel;
   d. means for mounting said light source within said housing chamber at a certain level above said housing base, including a hood detachably connected to said housing, said hood including a shoulder for pressing engagement with said patterned panel, and a clip extending along the base of said housing, said clip engaging said patterned panel;
   e. means for removably mounting said patterned panel in said first opening to said chamber; and
   f. a second opening to said chamber, said second opening being at a level in said housing above said source of light, said source of light lying between said first and second openings to said housing chamber.

2. The brake signal of claim 1 in which said means for mounting said light source includes a bracket fixed in an upright position relative to the base of said housing and a socket fixed to said bracket at an oblique angle relative to said bracket.

3. The brake signal of claim 1 which additionally comprises means for holding said housing to the vehicle.

* * * * *